INVENTORS
WILLIAM M. SHOOK
BY LESTER H. KLINE
Hoffmann and Yount
ATTORNEYS

INVENTORS
WILLIAM M. SHOOK
BY LESTER H. KLINE
Hoffmann and Yount
ATTORNEYS

United States Patent Office 3,303,752
Patented Feb. 14, 1967

3,303,752
HYDRAULIC VALVE SYSTEM FOR
HYDRAULIC ACTUATORS
William M. Shook, New Philadelphia, and Lester H. Kline, Dover, Ohio, assignors to The Warner & Swasey Company, Cleveland, Ohio, a corporation of Ohio
Filed Jan. 21, 1965, Ser. No. 426,792
15 Claims. (Cl. 91—414)

The present invention relates to a hydraulic system for controlling a plurality of hydraulic actuators and more particularly to valving means for controlling the flow of hydraulic fluid to and from the actuators.

An important object of the present invention is to provide a new and improved hydraulic system for controlling a plurality of hydraulic actuators having opposite sides to be connected to pressure and return respectively, and in which the control valves for the actuators have identical valve bodies and valve spools for controlling the fluid flow to and from the actuator but have valve plates which while identical in size have different fluid passageways therein which register with ports in the valve body or which operate to block the ports in the valve body to enable different valving functions and different fluid flows to be obtained in certain positions of the different valves.

A further object of the present invention is to provide a new and improved hydraulic system for controlling the operation of a plurality of hydraulic actuators in which valve means corresponding to each actuator has a valve body and valve spool identical to the valve means for the other actuators and different fluid flows through the valve means and to and from the actuator is provided by passage plates associated with each valve means and having passage ways which register with certain ports in the corresponding valve body, the different plates providing different hydraulic circuits for pressure to and from the various actuators and enable the pressure to the control valve to be dumped or carried through the valve with the latter in a neutral position, the return from the rod end of an actuator to be to the reservoir or to the head end of the actuator, the return from either side of the actuator to be carried through the valve, or the valve to be connected in series or to provide carry over to another valve.

Further objects and advantages of the present invention will be apparent from the following detailed description of the preferred embodiment thereof made with reference to the accompanying drawings forming a part of the present specification for all subject matter disclosed therein and in which.

Figure 1:
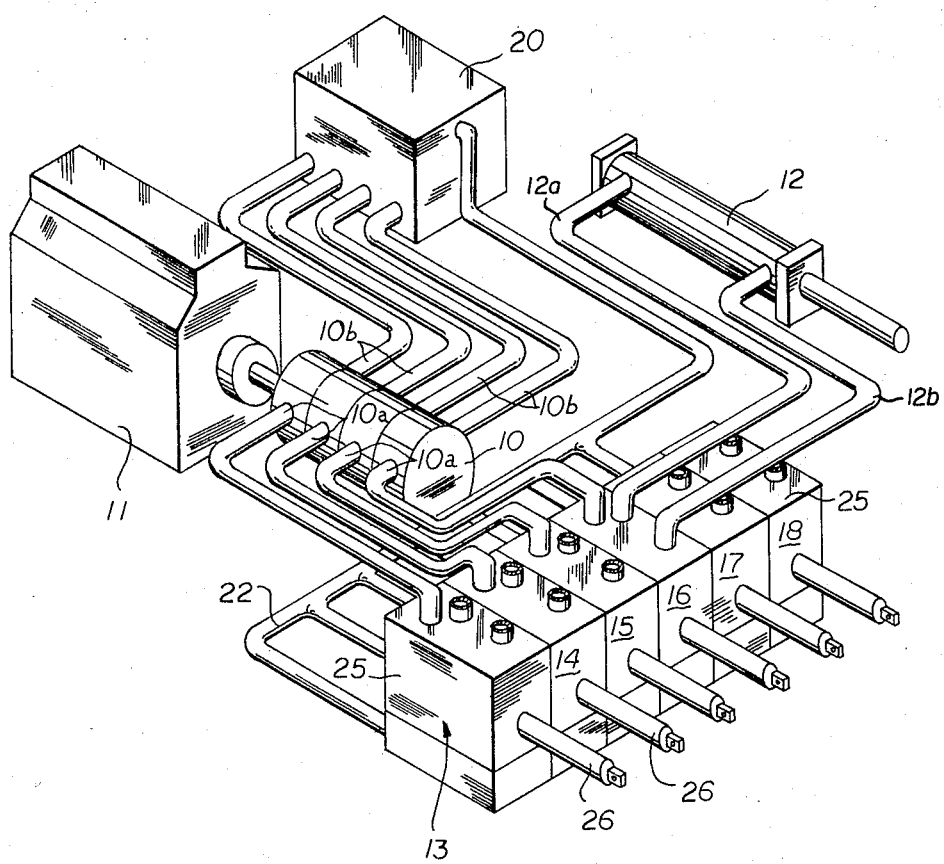
FIG. 1 is a diagrammatic view showing the hydraulic system embodying the present invention.

Referring to the drawings, the hydraulic system shown therein comprises a multisection pump 10 driven by a motor 11 for supplying fluid to a plurality of hydraulic actuators only one of which is shown in the drawing. The actuator shown in the drawing is a piston cylinder actuator which has been designated by the reference numeral 12 and it has a hydraulic conduit 12a connected to the head end of the actuator and a conduit 12b connected to the rod end of the actuator. Each of the actuators is controlled by a control valve and the control valves have been given the reference numerals 13, 14, 15, 16, 17, 18, respectively, the control valve 16 controlling the operation of the hydraulic actuator 12.

The pump 10 is shown as a four-section pump having four discharge conduits 10a and four conduits 10b connecting the intake of the pump with a reservoir 20. The discharge conduits are connected respectively to the valves 13, 14, 15 and 16. These valves, as described in more detail hereinafter, have outlet ports connected to the actuators controlled thereby and return passageways connected to a return conduit 22 which returns the hydraulic fluid to the reservoir or sump 20.

There are no pressure connections shown from the pump 10 to the control valves 17, 18. As will be explained hereinafter, these control valves receive a pressure supply through one of the other control valves.

Figure 2:
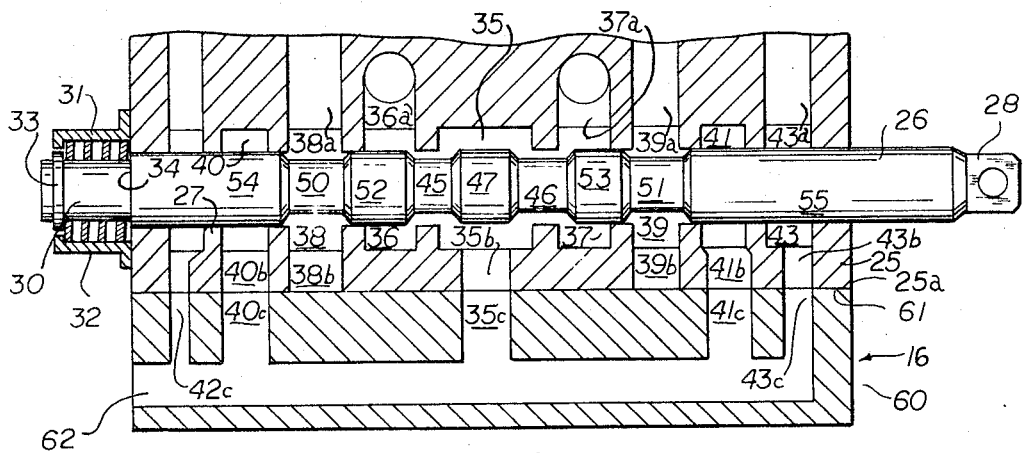
FIG. 2 is a cross sectional view of one of the control valves of FIG. 1.

Each of the control valves has a valve body 25 and a valve spool 26 which is identical to the valve bodies and valve spools of the other control valves. The valve body and valve spool of each valve is identical to that for valve 16 shown in FIGS. 2, 3 and 4, and as shown therein the valve spool 26 is reciprocable in a bore 27 in the valve body 25. The bore 27 extends through the valve body and the valve spool has a portion which extends outwardly of the valve body at one end to provide an operating connection 28 and a reduced portion 30 which extends outwardly of the valve body at the opposite end and is received by a spring housing 31. A coil spring is located in the spring housing 31 and at one end abuts a collar 33 on the reduced portion 30 of the valve spool and at the other end abuts the housing 31. The valve spool 26 has a shoulder 34 at the inner end of the reduced portion 30 which is adjacent or abuts the spring 32 when the valve spool is in a neutral position as shown in FIG. 2 and which will cause the spring to compress if the valve spool is shifted to the left as it is viewed in FIG. 3 to urge the valve spool to return to its neutral position. If the valve spool 26 is shifted to the right as in FIG. 4, the collar 33 will compress the spring 32 and the latter will tend to return the valve spool 26 to its neutral position.

The bore 27 in the valve body 25 has a plurality of spaced annular walls extending radially outwardly into the bore to define a plurality of chambers along the valve spool and the valve spool is provided with annular grooves and land portions which for various positions of the valve spool isolate adjacent chambers or place them in communication with each other. Referring to FIG. 2, the bore 27 has a central chamber 35 disposed between pressure chambers 36, 37. Outwardly of and adjacent the pressure chambers 36, 37 the bore has cylinder chambers 38, 39 and outwardly of and adjacent the cylinder chambers are return chambers 40, 41. Outwardly of the return chambers 40, 41 and at the opposite ends of the bore 27 are relief chambers 42, 43. The valve body has ports 36a, 37a, 38a and 39a, 42a 43a, and which open respectively into the chambers 36, 37, 38, 39, 42, 43. The ports 36a, 37a are connected to the conduit for supplying hydraulic fluid under pressure to the control valve and the ports 38a, 39a are connected to the head end and rod end respectively on opposite sides of the actuator 12. The valve body 25 has ports 35b, 38b, 39b 40b, 41b and 43b which respectively communicate with the chambers 38, 39, 40, 41, 42, 43 and which also open into the side 25a of the valve body 25.

Figure 3:
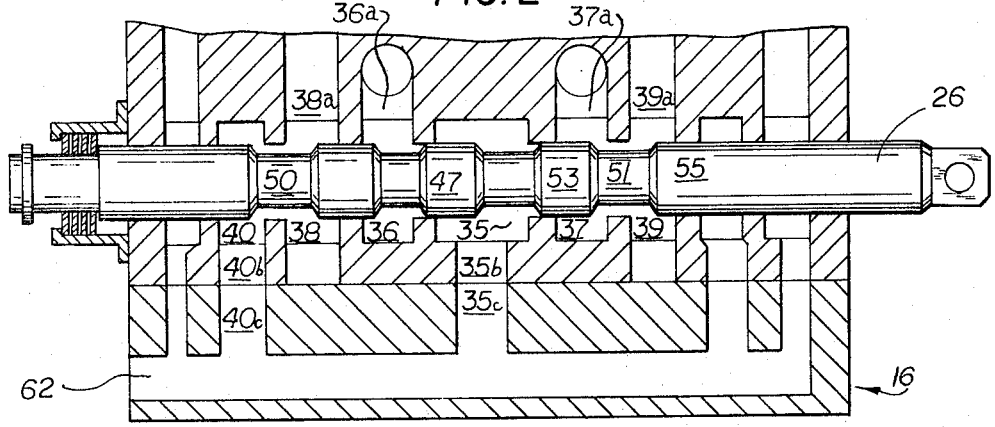
FIGS 3 and 4 are cross sectional views corresponding to FIG. 2 but showing the valve spool of the valve of FIG. 2 in different positions.

The valve spool 26 controls the interconnecting of the chambers and has spaced annular grooves 45, 46 at the central portion thereof providing a land 47 between the grooves 45 and 46. The spool 26 also has annular grooves 50, 51 spaced outwardly of the grooves 45, 46, respectively, providing a land 52 between the grooves 50, 45 and a land 53 between the grooves 46, 51. When the valve spool 26 is in its neutral position, the land 47 is disposed centrally in the chamber 35 and the pressure chambers 36, 37 are in communication with the central chamber 35 through the grooves 45, 46 in the valve spool while the lands 52, 53 are in a position blocking the flow between the pressure chambers 36, 37 and the adjacent cylinder chambers 38, 39. The portions of the valve spool outwardly of the grooves 50, 51 form land portions 54, 55 and in the neutral position of the valve spool (FIG. 2) these block communication between the cylinder chambers 38, 39 and the adjacent return chambers 40, 41. If the valve spool is shifted to the left (FIG. 3), the lands 47, 53 will block communication between the pressure chambers 36, 37 and the central chamber 35 and establish communication between the cylinder chamber 38 and the return chamber 40 through the groove 50 and communication between the cylinder chamber 39 and the pressure chamber 37 through the groove 51. If the valve spool 26 is shifted to the right, the lands 52, 47 will block communication between the pressure chambers 36, 37 and the central chamber 35 and the pressure chamber 36 will be placed in communication with the cylinder chamber 38 through the annular groove 50 while the cylinder chamber 39 will be placed in communication with the return chamber 41 through the annular groove 51, all as illustrated in FIG. 3.

While the valve bodies and valve spools are identical and the shifting of the valve spools in each case causes the same connection of the corresponding chambers inside the valve body, the actual return flow from the cylinders and pressure flow from the central chamber 35 may be different for the various valves. Each of the valves includes a passage plate which determines the path and destination of the fluid being returned from the cylinder and the destination of pressure fluid from the central chamber 35. Referring to FIGS. 2-5 which show the valve 16, a passage plate 60 therefor includes a return passage 62 which is connected to the return conduit 22 leading to the reservoir or sump 20. In addition, the passage plate 60 has fluid passageways or ports 35c, 40c, 41c, 42c and 43c which communicate with the return passage 62 and which open into a side 61 of the passage plate 60 which mates against the side 25a of the valve body 25. The passageways 42c, 40c, 41c and 43c register respectively with the ports 42b, 40b, 41b and 43b. Thus, the chambers 35, 42, 40, 41 and 43 of the valve body 25 are placed in communication with the return passage 62. The chambers 42, 43 which are connected to the return passage 62 through the ports 42b, 42c and the ports 43b, 43c are relief chambers and supply a return path for fluid from relieve valves in the connections to the actuators. These relief valves (not shown) may be inside of the valve body 25. Thus, if the pressure in the connections to the actuators exceeds a predetermined magnitude the pressure will be relieved and returned to the reservoir or sump through the chambers 42, 43 and the ports 42b, 43b and the ports 42c, 43c.

Since the central chamber 35, which may be termed a carry through chamber, is in communication with the return passage 62 in the passage plate 60, pressure fluid is returned to the reservoir from the pressure ports 36a, 37a when the valve spool is in its neutral position where the central chamber 35 is in communication with the pressure chambers 36, 37 and in turn with the ports 36a, 37a through the grooves 45, 46 on the valve spool. If the valve spool 26 is shifted to the left into the position shown in FIG. 3, the lands 47, 53 will be moved into positions to block flow from the pressure chambers 36, 37 to the central chamber 35. The shifting of the valve spool 26 into the position shown in FIG. 3 also positions the groove 51 so that it places the pressure chamber 37 in communication with the cylinder chamber 39 to supply pressure to the rod end of the actuator 12 through the cylinder port 39a. The head end of the actuator 12 which is connected to the cylinder port 38a will at this time be connected to the return passage 62 since the groove 50 on the valve spool 26 is now positioned where it places the cylinder chamber 38 in communication with the return chamber 40 which is, in turn, in communication with return passage 62 through the ports 40b and 40c.

Figure 4:
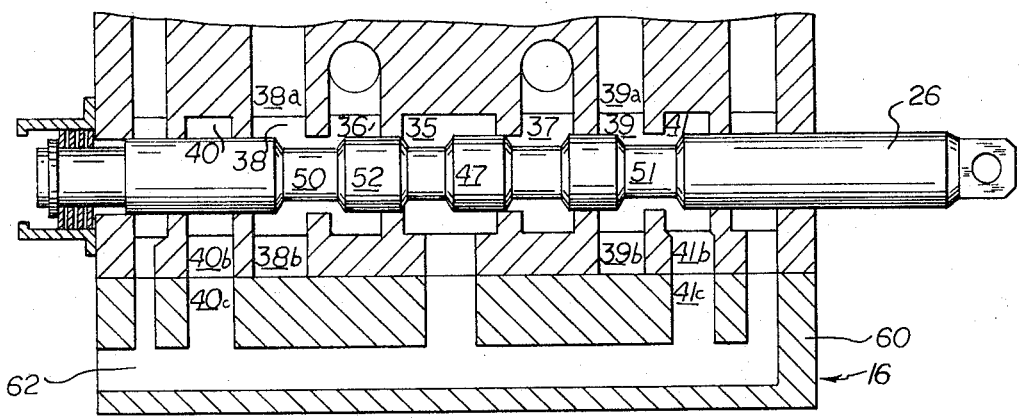
Figure 5:
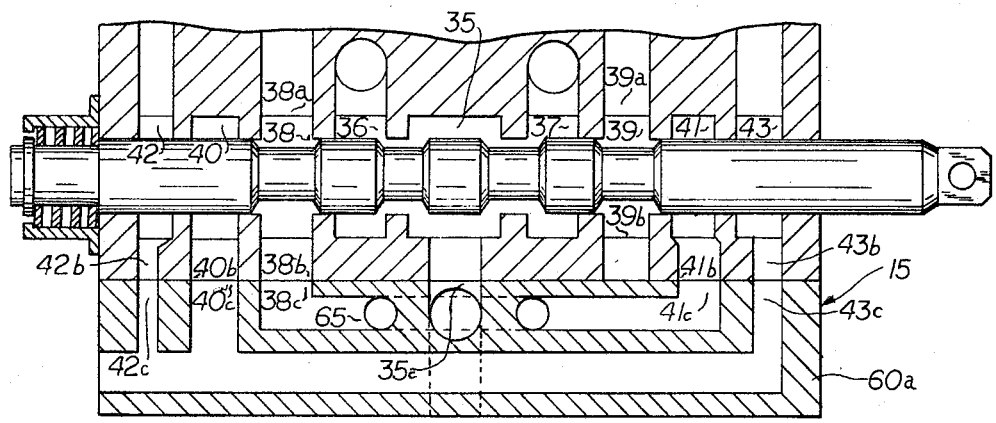
FIG. 5 is a sectional view through a different one of the control valves of FIG. 1.

When the valve spool 26 is shifted to the right from its neutral position into the position shown in FIG. 4, the lands 52, 47 are shifted to a position blocking communication between the pressure chambers 36, 37 and the central chamber 35. The groove 50 is positioned to place the pressure chamber 36 in communication with the cylinder chamber 38 to supply pressure to the head end of the actuator and the groove 51 is positioned to place the cylinder chamber 39 connected to the rod end of the actuator 12 into communication with the return chamber 41. As described above, the return chamber 41 is in communication with the return passage 62 through the port 41b and the port 41c in the passage plate 60.

From the foregoing it can be seen that the passage plate 60 has ports which register with the ports in the valve body 25 of the valve 16 to connect the central chamber to the return conduit so that when the valve spool 26 is in its neutral position, pressure is continuously returned to the reservoir from the pressure chambers 36, 37 and when the valve spool is shifted, pressure is supplied to one end of the actuator and the return side of the actuator is connected to the return conduit. It should be noted that the plate 60 blocks the cylinder ports 38b, 39b.

Figure 6:
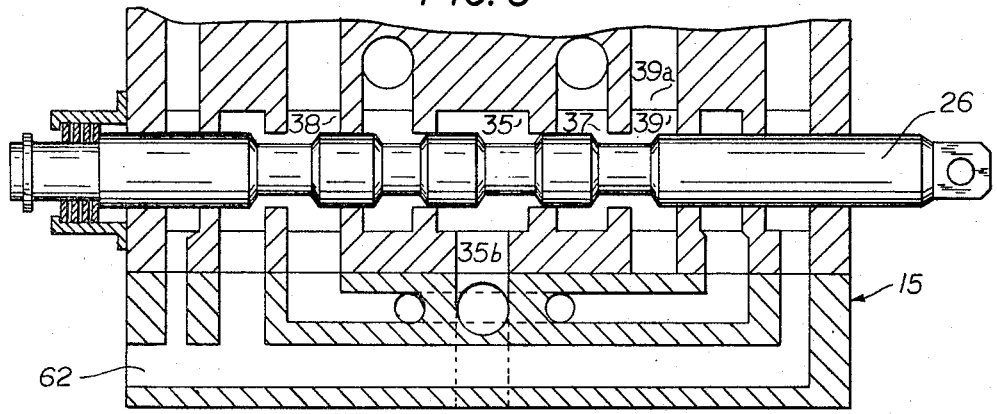
FIGS. 6 and 7 are cross sectional views corresponding to FIG. 5 but showing the valve spool of the valve of FIG. 5 in different positions.
Figure 7:
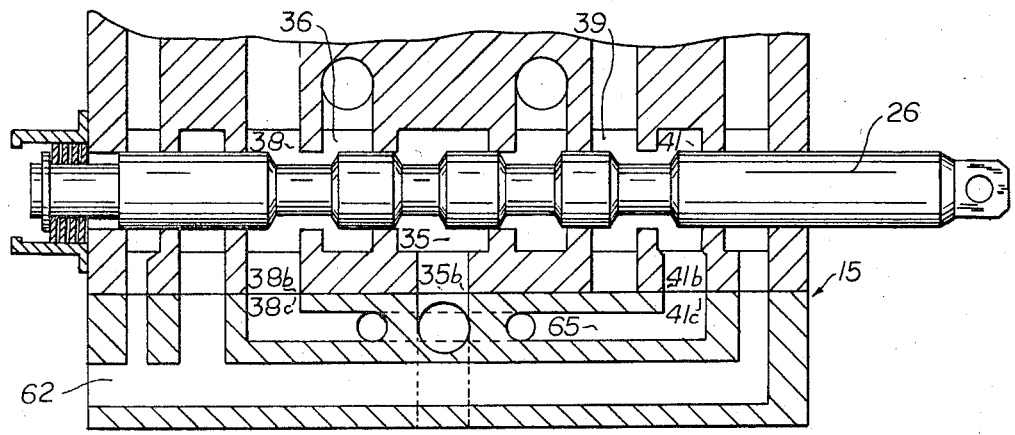

It is often desirable to connect the rod end of the cylinder to the head end of the cylinder when high speed operation of the actuator is desired. Control valve 15 has a passage plate 60a which effects the connection of the rod end of the actuator to the head end of the actuator when the valve is operated to supply pressure fluid to the head end. The valve 15 has a passage plate 60a which, like plate 60 of valve 16, has ports 42c, 40c, 35c, 41c and 43c which respectively register with the ports 42b, 41b, 35b, 40b and 43b. These ports, with the exception of port 41c, are, as in plate 60 of valve 16, connected to a return passage 62. The port 41c, however, is not interconnected to the return conduit as in the case of the end plate 60 for the valve 16 but instead is connected to a port 38c by a passageway 65. The port 38c registers with the port 38b in the valve body 25. Consequently, when the valve spool 26 is shifted to the right, as shown in FIG. 7, the cylinder chamber 39 is connected to the cylinder chamber 38 through the return chamber 41, the ports 41b, 41c, the passage 65 and the ports 38c, 38b. As described before, when the valve spool 26 is shifted to the right the cylinder chamber 38 which is connected to the head end of the actuator is under pressure from the pressure chamber 36. Consequently, the valve 15 will operate to interconnect the rod end and the head end of the actuator controlled thereby when pressure fluid is supplied to the head end so that fluid is returned from the rod end of the actuator through the return chamber 41 and the diversion passage 65 to the head end of the cylinder rather than to the reservoir or sump. When the valve spool 26 is shifted to the left as shown in FIG. 6, however, the cylinder chamber 38, which is connected to the head end of the cylinder, is connected to the return passage 62 through the return chamber 40 and the ports 40b, 40c and pressure is supplied to the rod end of the actuator from the pressure chamber 37 and the cylinder chamber 39.

As described with reference to valve 16, pressure fluid in the valve 15 will be returned to the sump or reservoir when the valve spool 26 is in its neutral position.

Figure 8:
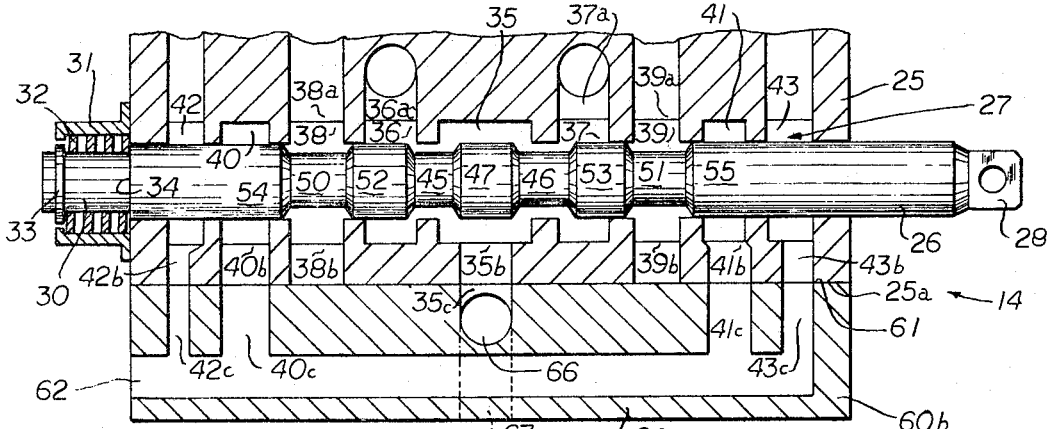
FIG. 8 is a cross sectional view through another control valve shown in FIG. 1.

The valve 14 shown in FIG. 8 has a passage plate 60b and is identical to the passage plate 60a except that the port 35c is not connected to the return conduit 62 but is connected by a passage 66 to an outlet port 67 in the side of the plate 60b opposite to the side in engagement with the valve body 25. Thus, fluid pressure from the chamber 35 is not returned to the reservoir or sump when the valve 26 is in its control position but is carried through the valve and in the preferred and illustrated embodiment the port 67 is connected to the pressure port for the control valve 17.

Figure 9:
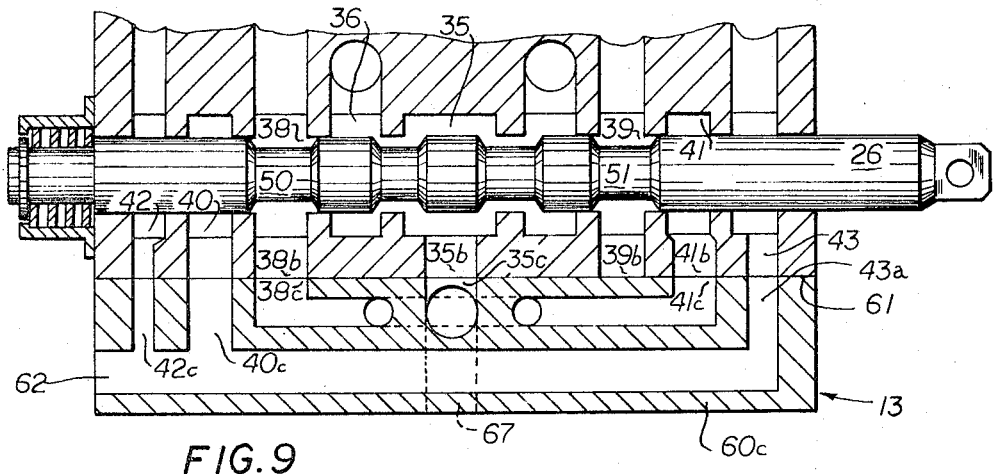
FIG. 9 is a cross sectional view through a different control valve shown in FIG. 1.

Control valve 13 (FIG. 9) is identical to the control valve 15 except that in its passage plate 60c, the port 35c is connected to an outlet port 67 to provide pressure carry through as in the case of control valve 14. Consequently, the control valve 13 includes the diversion passage 65 for interconnecting the rod end and the head end of a piston cylinder actuator and provides for carry through of pressure fluid when the valve spool 26 is in its neutral position.

Figure 10:
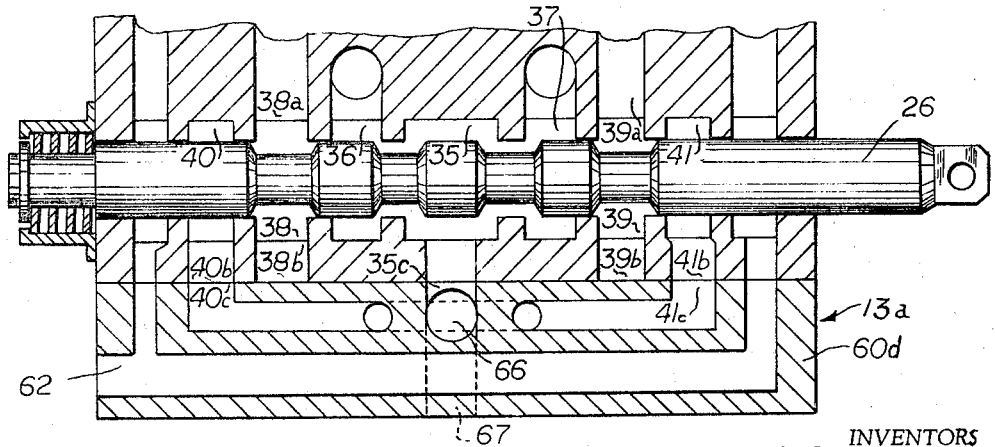
FIG. 10 is a cross sectional view through a control valve similar to the control valve of FIG. 9.

The valve 13 may be modified as shown in FIG. 10 to provide carry through of pressure fluid and return fluid. The valve 13a shown in FIG. 10 has a passage plate 60d in which the ports 35c, 40c, 41c are connected to the carry through passage 66. Consequently, when the control valve spool 26 is in its neutral position, pressure is supplied to the carry through passage 66 from the central chamber 35 and when the valve spool 26 is shifted, pressure fluid is supplied to the carry through passage 66 through the return chamber 40 or the return chamber 41 depending upon the direction of shifting of the valve spool 26.

Figure 11:
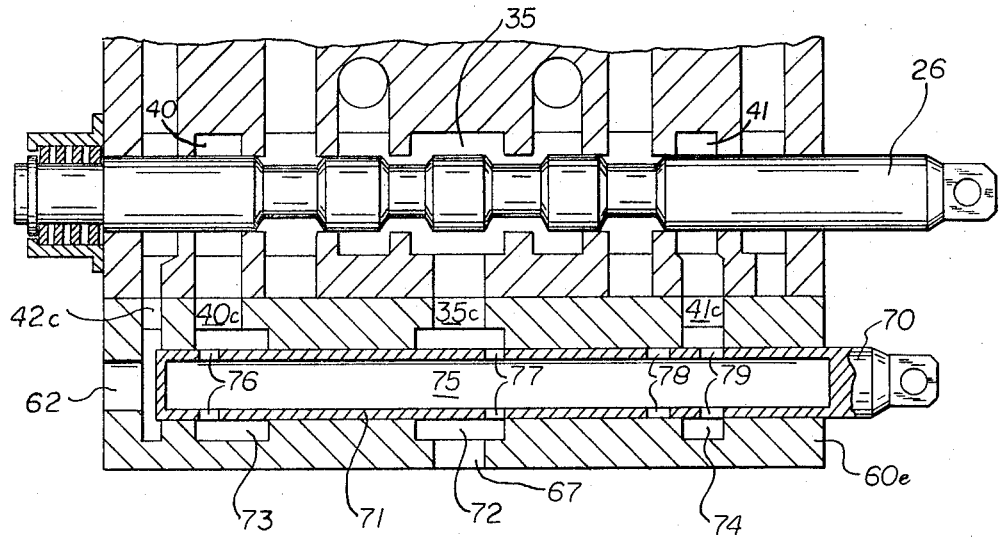
FIG. 11 is a cross sectional view through another form of control valve.
Figure 12:
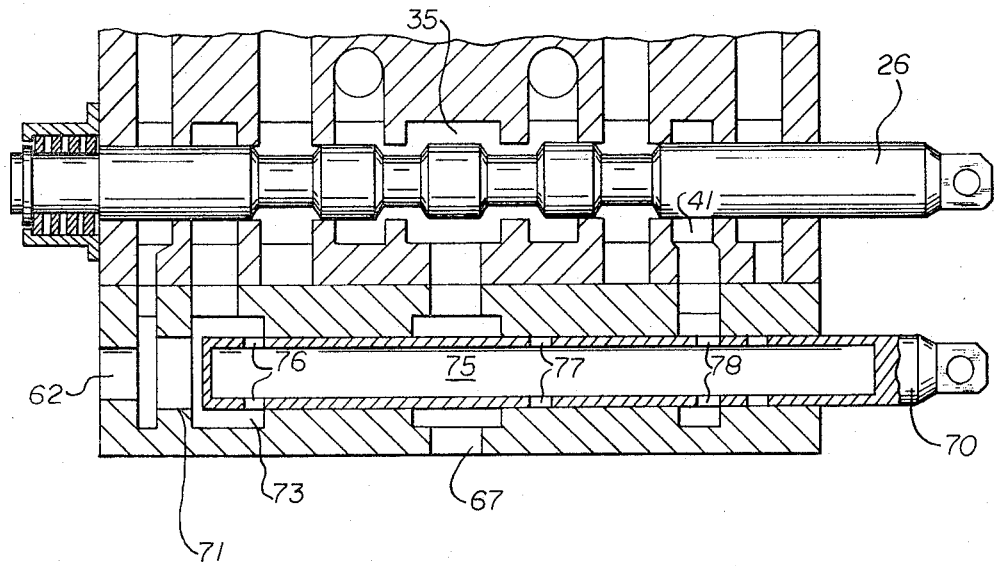
FIG. 12 is a view corresponding to FIG. 11 but showing a valve member thereof in a shifted position.

Under certain circumstances it is desirable to be able to connect one control valve in series with another control valve so that the pressure fluid to the second valve is supplied by carry over from the first valve, regardless of the position of the valve spool of the first valve. In other cases, it is desirable to have a pressure fluid supplied to the second valve from the first valve only when the valve spool of the first valve is in its neutral position. FIGS. 11 and 12 illustrate a valve means having a passage plate 60e which includes an auxiliary valve member 70 and passageways and ports such that the above described modes of operation can be obtained. Referring to FIG. 11, passage plate 60e of the control valve shown therein has ports 42c, 40c, 35c and 41c which register with the ports 42b, 40b, 35b and 41b in the valve body 25. The ports 35c, 40c and 41c open into a bore 71 in which the auxiliary valve member 70 is axially reciprocable. The ports 35c, 40c, 41c open into enlarged portions of the bore 91 designated by the reference numerals 72, 73, 74, respectively. The auxiliary valve member 70 is hollow and has ports 76 which open into the interior chamber 75 of the auxiliary valve member and which are located to remain within the enlarged portion 73 of the bore upon reciprocation of the auxiliary valve member 70. Also, the auxiliary valve member 70 has a port 77 which in one position of the auxiliary valve 70 opens into the enlarged bore portion 72, the latter being the portion into which the port 35c opens, and in the other position of the valve member 70 is out of communication with the enlarged bore portion 72 and is blocked by the side walls of bore 71. The valve member 70 also has a pair of ports 78, 79. Either the ports 78 or the ports 79 are positioned to communicate with the enlarged bore portion 74 for a respective position of the auxiliary valve member 70. Consequently, the ports 78, 79 provide communication between the return chamber 41 and the interior chamber 75 within the auxiliary valve member 70 and the return chamber 41 will therefore be connected to the interior chamber 75 for both positions of the auxiliary valve member 70.

When the auxiliary valve member 70 is in the position shown in FIG. 11, the inner end of the auxiliary valve member blocks communication between the enlarged bore portion 73 and the return passage 62 of the passage plate. However, when the valve member is shifted to the right as shown in FIG. 12, the enlarged portion 73 is placed in communication with the passage 62. Also, the hollow chamber 75 within the auxiliary valve is placed in communication with the return passage 62 through the port 76 and the enlarged bore portion 73.

When the auxiliary valve member is in its left hand position shown in FIG. 11, the return chamber 40 is connected to the hollow chamber 75 through the ports 76, the return chamber 41 is in communication with the interior chamber 75 through the ports 79, and the interior chamber is in communication with the enlarged bore portion 72 through the ports 77. The enlarged bore portion 72 communicates with an outlet or carry through port 67. Since the enlarged bore portion 72 is continuous communication with the central or carry through chamber 35, pressure fluid will be supplied from the central or carry through chamber 35 to the port 67 when the valve spool 26 is in its neutral position. When the valve spool 26 is shifted either in or out to connect either the return chamber 40 or the return chamber 41 to the return side of the actuator controlled by the valve, the fluid to the carry through port 67 from the central or carry through chamber 35 will be blocked by the fluid from the return side of the actuator and will be directed to the interior chamber 75 of the auxiliary valve member 70 through either the return chamber 40 or the return chamber 41 and from the interior chamber 75 through the port 77 to the outlet or carry through port 67 to supply the following valve. Consequently, the valve connected to the outlet port 67 will be supplied with pressure fluid regardless of the position of the valve spool 26.

When the auxiliary valve member 70 is shifted to the right as shown in FIG. 12, the port 77 is moved out of communication with the enlarged bore portion 72 so that the interior chamber 75 is no longer in communication with the enlarged bore portion 72 and the outlet port 67. Consequently, pressure fluid is available at the carry through or outlet port 67 only when the valve 26 is in its neutral position in which pressure fluid is supplied to the central or carry through chamber 35. The shifting of the valve spool to the right also places the enlarged bore portion 73 in communication with the return passage 62 through the end of the bore 71. Since the port 76 remains in communication with the enlarged bore portion 73 the interior chamber 75 is also connected to the return conduit and this places the return chamber 41 in the valve body 25 in communication with the return conduit 62 through the port 78 of the auxiliary valve member 70, hollow chamber 75 and the port 76.

It can now be seen that the present invention provides a hydraulic system for controlling actuators in which control valves for providing different fluid paths to and from the actuators have identical valve spools and valve bodies with the different fluid paths being provided by a passage plate corresponding to each valve. While in the description of the invention the bore in which the valve spool 26 operates has been described as having annular chambers and the chambers are illustrated as being defined by annular walls extending radially inwardly from the side walls of the bore, it will be readily understood that the bore may be of uniform diameter with the valve spool 26 being recessed in a conventional manner to provide the path for the fluid. It will be readily appreciated by those skilled in the art that the chambers described above would, in such a construction, be the section of the bore into which the ports corresponding to the ports 35, 36, 37, 38, 39, 40, 41 open. Moreover, the bore and chambers in the valve body may be formed by a separate valve sleeve.

While the preferred embodiment of the present invention has been described in considerable detail, it is hereby intended to cover all modifications and embodiments therein which fall within the ability of those skilled in the art and within the scope of the present invention.

Having thus described the invention, the following is claimed:

1. In a hydraulic system, a plurality of hydraulic actuators having opposite sides to be connected to different ones of pressure and return conduits, a respective control valve means for each of said actuators, each of said valve means being separate and comprising a valve body and valve spool with each of said valve bodies and valve spools being identical in construction to the other valve bodies and valve spools respectively and each valve body having a bore in which the corresponding valve spool reciprocates axially, the bore in each body having chambers along the length thereof and the spool therein having lands for controlling communication between adjacent chambers, the chambers including spaced cylinder chambers connected to opposite sides of the corresponding actuator and pressure and return chambers to be connected with respective ones of said cylinder chambers by the valve spool, the body having ports opening into each of the chambers and into one side of the valve body, each of said valve means including a passage plate for controlling flow through said ports, said plates each having passageways communicating with the ports of the corresponding valve body, the passageways and ports of different passage plates being different to provide different fluid paths for hydraulic fluid controlled by the respective valve means to provide different hydraulic circuits for corresponding positions of said valve spools.

2. A hydraulic system as defined in claim 1 wherein in each valve means said pressure chamber is adjacent one cylinder chamber and said return chamber is adjacent the other cylinder chamber and in a first one of said valve means the passage plate includes a passageway registering with and interconnecting said one of said cylinder chamber ports in the valve body and said return chamber port in the valve body to interconnect the opposite sides of the actuator, and in a second one of said valve means the said one cylinder chamber port is blocked by the passage plate and the return chamber port registers with a passageway in the plate which communicates with the return passage in the plate for returning pressure fluid to reservoir.

3. A hydraulic system as defined in claim 1 wherein said chambers of each of said valve means includes a carry through chamber adjacent the pressure chamber, certain of said valve means each having a passage plate including a first port registering with a port in the valve body communicating with the carry through chamber of the valve means, and in one of said certain valve means, the first port is connected to a return passage to reservoir and in another of said certain valve means is connected to a passage communicating with an outlet port for carry through pressure fluid from said carry through chamber.

4. A hydraulic system as defined in claim 3 wherein in each of said valve means said pressure chamber is adjacent one cyinder chamber and said return chamber is adjacent the other cylinder chamber and in a first one of said valve means the passage plate includes a passageway registering with and interconnecting said one cylinder chamber port in the valve body with said return chamber port in the valve body, and in a second one of said valve means the one cylinder chamber port is blocked by the passage plate and the return chamber port registers with a passageway in the plate which communicates with the return passage in the plate for returning pressure fluid to reservoir.

5. A hydraulic system as defined in claim 3 wherein the passage plate of said another of said certain valve means has a second port registering with said port communicating with said return chamber, said second port being in communication with said outlet port.

6. A hydraulic system as defined in claim 5 wherein in each of said valve means said pressure chamber is adjacent one cylinder chamber and said return chamber is adjacent the other cylinder chamber and in a first one of said valve means the passage plate includes a passageway registering with and interconnecting said one cylinder chamber port in the valve body with said return chamber port in the valve body, and in a second one of said valve means the said one cylinder chamber port is blocked by the passage plate and the return chamber port registers with a passageway in the plate which communicates with the return passage in the plate for returning pressure fluid to reservoir.

7. A hydraulic system as defined in claim 1 wherein one of said valve means includes a carry through chamber adjacent said pressure chamber and has a passage plate including an auxiliary valve having a position connecting ports registering with the ports in said valve body communicating with said carry through chamber and said return chamber to an outlet port in said passage plate, and a second position in which fluid from said carry through chamber is directed to said outlet port and from said return chamber is directed to reservoir.

8. In a hydraulic system, a plurality of hydraulic actuators having opposite sides to be connected to different ones of pressure and return conduits, a respective control valve means for each of said actuators, each of said valve means being separate and comprising a valve body and a valve spool, each of said valve bodies and valve spools being identical in construction to the other valve bodies and valve spools and each valve body having a bore in which the corresponding valve spool is axially reciprocable, each body having different chambers along the length thereof and the spool therein having grooves and lands for controlling the communication between adjacent chambers upon reciprocation of the spool, the chambers in each valve body comprising a central chamber disposed between pressure chambers, cylinder chambers outwardly of the pressure chambers from the central chamber connected to opposite sides of the corresponding actuators and return chambers outwardly of the presure chambers, said valve spool having a neutral position in which said pressure chambers are in communication with said central chamber and blocked from said cylinder chambers and in which said cylinder chambers are blocked from the other chambers and movable in one direction to a position where one cylinder chamber is connected to the adjacent pressure chamber and the other cylinder chamber connected to the adjacent return chamber and the central chamber blocked from the pressure chambers and to a second position wherein said one cylinder chamber is connected to the adjacent return chamber and said other cylinder chamber is connected to the adjacent pressure chamber and said central chamber is blocked from said pressure chambers, said valve bodies further having ports therein communicating with respective ones of said chambers in the bore and with one side of the valve body and each of said valve means further including a passage plate having a return passage therein connected to reservoir and fluid passageways registering with ports of the valve body, the fluid passageways in certain valve means being different from the passageways in other of said valve means to provide hydraulic circuits which are different for different valve means, said ports in said valve bodies comprising cylinder chamber ports, and return chamber ports.

9. A hydraulic system as defined in claim 8 wherein the passage plate of one of said valve means includes a passageway regitsering with and interconnecting one of said cylinder chamber ports and one of said return chamber ports to provide for interconnection of the opposite sides of an actuator controlled by the valve, and in a second one of said valve means the port communicating with said one cylinder chamber port is blocked by the passage plate and the return chamber ports register with passageways in the plate which communicate with the return passage in the passage plate for returning pressure fluid to reservoir.

10. In a hydraulic system according to claim 8 wherein the ports of each of said valve means further include a central chamber port and the return chamber ports in one of said valve means and the central chamber port register with passageways in the passage plate which communicate with a carry through passage and an outlet port for providing a carry through the valve where fluid is supplied from the central chamber or from the return chambers and in other of said valve means, the fluid connections for said return chambers and said central passageways are different.

11. In a hydraulic system according to claim 8 wherein the ports of each of said valve means further include a central chamber port and the port connected with the central chamber registers in certain of said valve means with a fluid passageway in the passage plate which communicates with the return passage and in another of said valve means with a passageway in the passage plate which communicates with an outlet port to provide a carry through for pressure fluid.

12. A hydraulic system as defined in claim 11 wherein the passage plate of one of said valve means includes a passageway registering with and interconnecting one of said cylinder chamber ports and said one of said return chamber ports to provide for interconnection of the opposite sides of an actuator controlled by the valve, and in a second one of said valve means the port communicating with said one cylinder chamber is blocked by the passage plate and the return chamber ports register with passageways in the plate which communicate with the return passage in the passage plate for returning pressure fluid to reservoir.

13. In a hydraulic system according to claim 11 wherein the return chamber ports in one of said valve means and the central chamber port register with passageways in the passage plate which communicate with a carry through passage and an outlet port for providing a carry through the valve where fluid is supplied from the central chamber or from the return chambers and in other of said valve means, the fluid connections for said return chambers and said central passageways are different.

14. A hydraulic system as defined in claim 13 wherein the passage plate of one of said valve means includes a passageway registering with and interconnecting one of said cylinder chamber ports and said one of said return chamber ports to provide for interconnection of the opposite sides of an actuator controlled by the valve, and in a second one of said valve means the port communicating with said one cylinder chamber is blocked by the passage plate and the return chamber ports register with passageways in the plate which communicate with the return passage in the passage plate for returning pressure fluid to reservoir.

15. A hydraulic system as defined in claim 8 wherein one of said valve means includes a carry through chamber adjacent said pressure chamber and has a passage plate including an auxiliary valve having position connecting ports registering with the ports in said valve body communicating with said carry through chamber and said return chamber to an outlet port in said passage plate, and a second position in which fluid from said carry through chambers is directed to said outlet port and from said return chamber is directed to reservoir.

References Cited by the Examiner

UNITED STATES PATENTS 2,511,184  6/1950  Walling _____ 60—52
2,635,586  4/1953  Kuhn _____ 60—52

EDGAR W. GEOGHEGAN, *Primary Examiner.*